United States Patent
Ha et al.

(10) Patent No.: US 10,002,719 B2
(45) Date of Patent: Jun. 19, 2018

(54) SEPARATOR HAVING BINDER LAYER, AND ELECTROCHEMICAL DEVICE COMPRISING THE SEPARATOR AND METHOD OF PREPARING THE SEPARATOR

(71) Applicants: LG Chem, Ltd., Seoul (KR); TORAY INDUSTRIES, INC., Tokyo (JP)

(72) Inventors: Jeong-Min Ha, Daejeon (KR); Su-Jin Yoon, Daejeon (KR); Jong-Hun Kim, Daejeon (KR); Byoung-Jin Shin, Daejeon (KR); Joo-Sung Lee, Daejeon (KR); Jin-Woo Kim, Daejeon (KR); Da-Kyung Han, Daejeon (KR)

(73) Assignees: LG Chem, Ltd. (KR); TORAY INDUSTRIES, INC. (JP)

(*) Notice: Subject to any disclaimer, the term of this patent is extended or adjusted under 35 U.S.C. 154(b) by 504 days.

(21) Appl. No.: 14/691,085

(22) Filed: Apr. 20, 2015

(65) Prior Publication Data

US 2015/0303003 A1    Oct. 22, 2015

Related U.S. Application Data

(60) Provisional application No. 61/982,020, filed on Apr. 21, 2014.

(51) Int. Cl.
| | |
|---|---|
| *H01G 11/52* | (2013.01) |
| *H01M 2/16* | (2006.01) |
| *H01M 10/052* | (2010.01) |
| *H01M 2/14* | (2006.01) |
| *H01M 8/0239* | (2016.01) |
| *H01M 8/0245* | (2016.01) |

(52) U.S. Cl.
CPC ............ *H01G 11/52* (2013.01); *H01M 2/145* (2013.01); *H01M 2/166* (2013.01); *H01M 2/1666* (2013.01); *H01M 2/1686* (2013.01); *H01M 8/0239* (2013.01); *H01M 8/0245* (2013.01); *H01M 10/052* (2013.01); *Y02E 60/13* (2013.01)

(58) Field of Classification Search
None
See application file for complete search history.

(56) References Cited

U.S. PATENT DOCUMENTS 6,218,051 B1 * 4/2001 Yokohata ............ H01M 2/1653
                                                429/249
9,887,419 B2 * 2/2018 Kim ...................... H01M 4/483
(Continued)

FOREIGN PATENT DOCUMENTS

| EP | 2541644 A2 † | 1/2013 |
|---|---|---|
| JP | 2000-149903 A | 5/2000 |

(Continued)

*Primary Examiner* — Scott J Chmielecki
(74) *Attorney, Agent, or Firm* — Lerner, David, Littenberg, Krumholz & Mentlik, LLP (57) ABSTRACT

The present disclosure provides a separator comprising a porous substrate, a porous coating layer and a binder layer, the binder comprising at least one homopolymer of polyvinylidene fluoride and at least one copolymer of polyvinylidene fluoride (PVDF)-co-hexafluoropropylene (HFP) so that a content difference of hexafluoropropylene (HFP) present in the two compounds is about 3 wt % or higher.

23 Claims, 2 Drawing Sheets

(56) References Cited

U.S. PATENT DOCUMENTS

| | | | | |
|---|---|---|---|---|
| 2004/0211943 A1* | 10/2004 | Okahara | ................ | C09D 5/24 |
| | | | | 252/511 |
| 2006/0286446 A1* | 12/2006 | Chun | ...................... | B32B 27/12 |
| | | | | 429/142 |
| 2011/0189518 A1* | 8/2011 | Fujita | ................ | H01M 10/0431 |
| | | | | 429/94 |
| 2012/0034533 A1* | 2/2012 | Hong | ................. | H01M 10/052 |
| | | | | 429/332 |
| 2013/0101886 A1* | 4/2013 | Jung | ...................... | H01M 2/16 |
| | | | | 429/144 |
| 2013/0137001 A1* | 5/2013 | Zhang | .................. | H01M 4/382 |
| | | | | 429/405 |
| 2013/0164637 A1* | 6/2013 | Lee | .................. | H01M 10/0569 |
| | | | | 429/338 |
| 2013/0295466 A1* | 11/2013 | Kwon | ................... | C08J 5/2275 |
| | | | | 429/309 |
| 2013/0316252 A1* | 11/2013 | Lee | ..................... | H01M 10/056 |
| | | | | 429/332 |
| 2014/0017549 A1* | 1/2014 | Miyazaki | ............. | H01M 4/583 |
| | | | | 429/145 |
| 2014/0050965 A1 | 2/2014 | Ha et al. | | |
| 2014/0255754 A1* | 9/2014 | Nishikawa | ............ | H01M 2/027 |
| | | | | 429/145 |
| 2015/0056515 A1* | 2/2015 | Kim | ....................... | H01M 4/483 |
| | | | | 429/231.5 |
| 2015/0086859 A1* | 3/2015 | Chang | .................. | H01M 4/485 |
| | | | | 429/188 |
| 2015/0249268 A1* | 9/2015 | Hong | .................... | H01M 4/505 |
| | | | | 429/331 |
| 2015/0349326 A1* | 12/2015 | Miyazaki | ............. | H01M 4/505 |
| | | | | 429/220 |
| 2016/0293957 A1* | 10/2016 | Okae | ....................... | H01M 4/13 |

FOREIGN PATENT DOCUMENTS

| | | | | |
|---|---|---|---|---|
| JP | 4049321 B2 | 2/2008 | | |
| JP | 4365662 B2 | 11/2009 | | |
| KR | 20030094696 A | 12/2003 | | |
| KR | 20110129203 A | 12/2011 | | |
| KR | 2012-0093772 A | 8/2012 | | |
| WO | 2013058370 A1 † | 4/2013 | | |
| WO | WO-2013058370 A1 * | 4/2013 | ............ | H01M 2/027 |

* cited by examiner
† cited by third party

SEPARATOR HAVING BINDER LAYER, AND ELECTROCHEMICAL DEVICE COMPRISING THE SEPARATOR AND METHOD OF PREPARING THE SEPARATOR

CROSS-REFERENCE TO RELATED APPLICATION

This application claims priority to U.S. Provisional Application No. 61/982,020 filed on Apr. 21, 2014, the disclosures of which are incorporated herein by reference.

TECHNICAL FIELD

The present disclosure relates to a separator having a binder layer, an electrochemical device comprising the separator, and a method of preparing the separator.

BACKGROUND ART

Recently, there has been an increasing interest in energy storage technology. Electrochemical devices have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention.

The electrochemical devices have been improved in their various performances, particularly, output, through consistent research. Among currently available secondary batteries, lithium secondary batteries developed in the early 1990's have drawn particular attention due to their advantages of higher operating voltages and much higher energy densities than conventional aqueous electrolyte-based batteries such as Ni-MH and the like. However, such lithium secondary batteries suffer from safety problems such as fire and explosion, according to use environment.

In order to overcome the safety problems of disadvantages of lithium secondary batteries, there is still a need to develop a binder that can increase a binding forcer between electrodes and a separator, particularly, a porous coating layer in the separator to induce strong integration of the electrodes and the separator, thereby strengthening safety, and can inhibit a resistance increase in interfaces between the electrodes and the separator, which may be generated by the side reaction of the electrodes during charging and discharging cycles, and also can improve air permeability, and for a separator using the binder.

DISCLOSURE

Technical Problem

Accordingly, it is an object of the present disclosure to provide a separator comprising a binder that can increase a binding forcer between electrodes and a porous coating layer present in a separator to induce strong integration of the electrodes and the separator, thereby strengthening safety, and can inhibit a resistance increase in interfaces between the electrodes and the separator, which may be generated by the side reaction of the electrodes during charging and discharging cycles, and also can improve air permeability.

Technical Solution

In order to achieve the object, in accordance with one aspect of the present disclosure, there is provided a separator comprising a porous substrate having multiple pores; a porous coating layer formed on at least one surface of the porous substrate comprising a mixture of inorganic particles and a binder, the binder comprising at least one compound of formula (I) and at least one compound of formula (II) so that a content difference between hexafluoropropylene (HFP) in the compound of formula (I) and that in the compound of formula (II) is 3 wt % or higher; a binder layer comprising at least one compound of formula (I) and at least one compound of formula (II), wherein a fraction of the compound of formula (II) in both of the porous coating layer and the binder layer is greater than 10% and less than 99%, the fraction being calculated by dividing the content of the compound of formula (II) with the total content of the compound of formula (I) and the compound of formula (II), and a fraction of the compound of formula (II) in the binder layer is 50 to 99%:

$$-(VDF)_a-(HFP)_b- \quad (I)$$

$$-(VDF)_c-(HFP)_d- \quad (II)$$

wherein, VDF represents vinylidene fluoride,
HFP represents hexafluoropropylene, and
each of a, b, c and d represents wt %, provided that a+b=100, c+d=100, b≥0, d>0 and d−b≥3.

Unless otherwise noted in this specification, a fraction refers to fraction by wt %.

In accordance with another aspect of the present disclosure, there is provided a method of preparing a separator, comprising dissolving a binder in a polar solvent to produce a binder solution, the binder comprising at least one compound of formula (I) and at least one compound of formula (II) so that a content difference between hexafluoropropylene (HFP) in the compound of formula (I) and that in the compound of formula (II) is 3 wt % or higher; adding inorganic particles to the binder solution, followed by stirring, to produce a slurry containing the inorganic particles dispersed therein; and coating the slurry on at least one surface of a porous substrate, followed by drying, to form a porous coating layer on at least one surface of the porous substrate or on at least one pore-bearing area in the porous substrate, the porous coating layer comprising a binder layer in the outermost part thereof in the thickness direction of the porous substrate, the binder layer having the compound of formula (II) in a fraction of 50 to 99%, the fraction being calculated by dividing the content of the compound of formula (II) with the total content of the compound of formula (I) and the compound of formula (II), wherein a fraction of the compound of formula (II) in the binder solution is greater than 10% and less than 99%.

Further, in accordance with still another aspect of the present disclosure, there is provided an electrochemical device comprising the above-mentioned separator, particularly a lithium secondary battery.

Advantageous Effects

The separator according to one aspect of the present disclosure has a porous coating layer with a binder layer, the binder layer being concomitantly formed during drying the porous coating layer comprising a binder, without an additional step of forming the binder layer, and the binder layer thus formed has good adhesiveness with electrodes and inhibits a resistance increase in interfaces between the electrodes and the binder layer, thereby enhancing cycle characteristics.

DESCRIPTION OF DRAWINGS

The accompanying drawings illustrate preferred embodiments of the present disclosure, but the present disclosure is not to be construed as being limited to the drawings.

BEST MODE

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Accordingly, the embodiments proposed herein are just a preferable example for the purpose of illustrations only, not intended to limit the scope of the disclosure, so it should be understood that other equivalents and modifications could be made thereto without departing from the spirit and scope of the disclosure.

Figure 1:
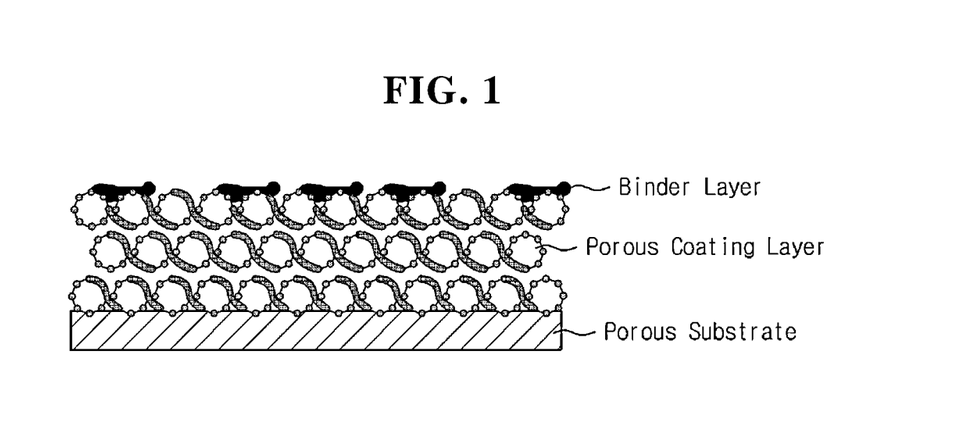
FIG. 1 schematically shows a cross-section of a separator comprising a porous substrate, a porous coating layer and a binder layer, prepared according to one embodiment of the present disclosure.

FIG. 1 schematically shows a cross-section of a separator comprising a porous substrate, a porous coating layer and a binder layer, prepared according to one embodiment of the present disclosure.

Referring to FIG. 1, the separator according to one aspect of the present disclosure comprises a porous substrate having multiple pores; a porous coating layer formed on at least one surface of the porous substrate comprising a mixture of inorganic particles and a binder; and a binder layer formed on the porous coating layer. In the present disclosure, the binder layer has porosity to improve the ionic conductivity of the separator, and has good adhesiveness with electrodes. Also, the binder layer acts as a layer for adhesion with electrodes, which facilitates adhesion between the porous coating layer and the electrodes in the preparation of an electrode assembly.

In the present disclosure, the porous substrate may be any one which has been conventionally used in electrochemical devices. Non-limiting examples of the porous substrate include a polymer membrane or a multiple-membrane thereof, a woven fabric or a non-woven fabric made of a polymer selected from the group consisting of polyethylene, polypropylene, polyethylene terephthalate, polybutylene terephthalate, polyester, polyacetal, polyamide, polycarbonate, polyimide, polyether ether ketone, polyaryl ether ketone, polyetherimide, polyamideimide, polybenzimidazole, polyethersulfone, polyphenyleneoxide, cyclic olefin copolymer, polyphenylenesulfide, polyethylene naphthalate and a mixture thereof.

The porous substrate may have a thickness of about 5 to about 50 μm, but is not limited thereto. Also, pores present in the porous substrate may be a size of about 0.01 to about 50 μm, and the porosity of the porous substrate may be about 10 to about 95%, but the present disclosure is not limited thereto.

In the porous coating layer, the binder may comprise at least one compound of formula (I) (hereinafter, also referred to as a first binder) and at least one compound of formula (II) (hereinafter, also referred to as a second binder) so that a content difference between hexafluoropropylene (HFP) in the compound of formula (I) and that in the compound of formula (II) is about 3 wt % or higher:

-(VDF)$_a$-(HFP)$_b$-     (I)

-(VDF)$_c$-(HFP)$_d$-     (II)

wherein, VDF represents vinylidene fluoride,
HFP represents hexafluoropropylene, and
each of a, b, c and d represents wt %, provided that a+b=100, c+d=100, b≥0, d>0 and d−b≥3.

Alternatively, the binder may comprise a homopolylmer of polyvinylidene fluoride and a copolymer of polyvinylidene fluoride (PVDF)-co-hexafluoropropylene (HFP), and a content difference of hexafluoropropylene (HFP) present in the two compounds is about 3 wt % or higher.

The compounds used as the binder have a content difference of hexafluoropropylene (HFP) present in the two compound equal to or greater than about 3 wt %, which may be represented by the following equation: Content of HEF in PVDF$_{high\ HFP}$−Content of HEF in PVDF$_{low\ HFP}$≥3 wt % (wherein, PVDF$_{high\ HFP}$ is a polymer of PVDF having relatively high amounts of HFP, and PVDF$_{low\ HFP}$ is a polymer of PVDF having relatively low amounts of HFP). That is, PVDF$_{high\ HFP}$ refers to the compound of formula (II) having relatively high amounts of HFP, and PVDF$_{high\ HFP}$ refers to the compound of formula (I) having relatively low amounts of HFP.

Also, a fraction of the compound of formula (II) (content of the compound of formula (II)/(content of the compound of formula (I)+content of the compound of formula (II))) may be greater than about 10% and less than about 99%, preferably 30 to 90%. Alternatively, a fraction of the compound of formula (II) may be represented by a fraction of PVDF$_{high\ HFP}$ (content of PVDF$_{high\ HFP}$/(content of PVDF$_{low\ HFP}$+content of PVDF$_{high\ HFP}$)).

If the fraction of the compound of formula (II) (PVDF$_{high\ HFP}$) fails to satisfy the above-mentioned range, the binder layer finally formed may have poor adhesiveness with electrodes. Specifically, if the fraction of the compound of formula (II) is 10% or less, the content of the compound of formula (I) in the binder increases and thereby HFP is present in low amounts. In this case, the melting point (Mp) of binder increases due to the low amount of the HFP, resulting in an unfavorable lamination of the electrodes and the separator. If the fraction of the compound of formula (II) is 99% or higher, it is difficult for the porous binder layer to be formed on the outermost part of the porous coating layer, and thus the ionic conductivity of the separator decreases to deteriorate battery performances.

The binder including the compound of formula (I) and the compound of formula (II) may be present in an amount of about 3 to about 50 parts by weight, preferably about 5 to about 30 parts by weight, based on 100 parts by weight of the inorganic particles. If the content of the binder is less than 3 parts by weight based on 100 parts by weight of the inorganic particles, the binder layer cannot be effectively formed due to very small amounts of the binder and it is difficult for the binder to exert the function that connects or immobilizes the inorganic particles on the porous substrate.

If the content of these compounds is higher than 50 parts by weight, the binder layer is formed very thick and pores in the porous coating layer are plugged to cause the decrease of air permeability, thereby deteriorating battery performances.

Optionally, the porous coating layer may further comprise a dispersant, in accordance with one embodiment of the present disclosure.

The dispersant may be any one selected from acrylic copolymers and a mixture thereof, which functions to improve the dispersibility of the inorganic particles. Also, the dispersant may act as a binder having adhesiveness, in addition to such function.

The dispersant includes a polar group, and the polar group allows the dispersant to interact with the surface of inorganic particles and thus increase the dispersibility of the inorganic particles. In addition, it is easy to control properties of the dispersant, and dispersion and adhesion of the dispersant may be improved in a balanced way. For this reason, the dispersant may contribute to safety of a separator including the dispersant and an electrochemical device using the separator.

The acrylic copolymer may be a copolymer containing at least one functional group selected from the group consisting of OH, COOH, CN, amine, amide and a combination thereof.

The acrylic copolymer may be a copolymer containing at least one first functional group and at least one second functional group. The first functional group may be selected from OH and COOH groups, and the second functional group may be selected from amine and amide groups. If a polymer having OH or COOH group is used alone, adhesiveness increases but dispersibility may be lowed, making it difficult to obtain uniform coating. If a polymer having amine and/or amide groups is used alone, adhesiveness may decrease even though dispersibility is raised. Accordingly, by using a copolymer comprising at least one functional group selected from OH and COOH groups as the first functional group and at least one functional group selected from amine and amide groups as the second functional group, it is possible to obtain uniform coating satisfying good adhesiveness and sufficient dispersibility.

The acrylic copolymer may have a repeating unit derived from a monomer having the first functional group and a repeating unit derived from a monomer having the second functional group.

Non-limiting examples of the monomer having the first functional group include (meth)acrylic acid, 2-(meth)acryloyloxy acetic acid, 3-(meth)acryloyloxy propylic acid, 4-(meth)acryloyloxy butylic acid, acrylic acid dimer, itaconic acid, maleic acid, maleic acid anhidride, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, 2-hydroxypropylene glycol (meth)acrylate and a mixture thereof.

The monomer having the second functional group has at least one of amine and amide groups in the side chain thereof, and non-limiting examples thereof include 2-(((butoxyamino)carbonyl)oxy)ethyl(meth)acrylate, 2-(diethylamino)ethyl(meth)acrylate, 2-(dimethylamino)ethyl(meth)acrylate, 3-(diethylamino)propyl(meth)acrylate, 3-(dimethylamino)propyl(meth)acrylate, methyl 2-acetamido(meth)acrylate, 2-(meth)acrylamidoglycol acid, 2-(meth)acrylamido-2-methyl-1-propanesulfonic acid, (3-(meth)acrylamidopropyl)trimethyl ammonium chloride, N-(meth)acryloylamido-ethoxyethanol, 3-(meth)acryloyl amino-1-propanol, N-(butoxymethyl)(meth)acryloamide, N-tert-butyl(meth)acrylamide, diacetone(meth)acrylamide, N,N-dimethyl(meth)acrylamide, N-(isobutoxymethyl)acrylamide, N-(isopropyl)(meth)acrylamide, (meth)acrylamide, N-phenyl(meth)acrylamide, N-(tris(hydroxymethyl)methyl) (meth)acrylamide, N—N'-(1,3-phenylene)dimaleimide, N—N'-(1,4-phenylene)dimaleimide, N—N'-(1,2-dihydroxyethylene)bisacrylamide, N—N'-ethylenebis(meth) acrylamide, N-vinylpyrrolidinone and a mixture thereof.

Examples of such an acrylic copolymer include a copolymer of ethyl acrylate-acrylic acid-N,N-dimethylacrylamide, a copolymer of ethyl acrylate-acrylic acid-2-(dimethylamino)ethyl acrylate, a copolymer of ethyl acrylate-acrylic acid-N,N-diethylacrylamide, a copolymer of ethyl acrylate-acrylic acid-2-(diethylamino)ethyl acrylate, and a mixture thereof, but are not limited thereto.

Also, in addition to the above-mentioned binder, an additional binder may be used to strengthen the binding force of the inorganic particles and enhance the durability of the porous coating layer. Non-limiting examples of such an additional binder include polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer and polyimide, which may be used alone or in a mixture of two or more.

The inorganic particles are not particularly limited if they are electrochemically stable. That is, the inorganic particles which may be used in the present disclosure are not particularly limited unless an oxidation-reduction reaction occurs in an operating voltage range (for example, 0 to 5 V based on $Li/Li^+$) of an applied electrochemical device. Particularly, when inorganic particles capable of transporting ions are used, the ionic conductivity of electrochemical devices may increase to achieve performance enhancement.

Also, inorganic particles having a high dielectric constant may be used to increase a dissociation rate of an electrolyte salt, e.g., a lithium salt, in a liquid electrolyte, thereby improving an ionic conductivity of the electrolyte.

For the foregoing reasons, the inorganic particles used in the present disclosure preferably include inorganic particles having a dielectric constant of 5 or higher, preferably 10 or higher, inorganic particles capable of transporting lithium ions, and a mixture thereof. Non-limiting examples of the inorganic particles having a dielectric constant of 5 or higher include inorganic particles of $BaTiO_3$, $Pb(Zr, Ti)O_3$ (PZT), $Pb_{1-x}La_xZr_{1-y}Ti_yO_3$ (PLZT), $Pb(Mg_3Nb_{2/3})O_3$-$xPbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC and a mixture thereof.

Among these, inorganic particles of $BaTiO_3$, $Pb(Zr, Ti)O_3$ (PZT), $Pb_{1-x}La_xZr_{1-y}Ti_yO_3$ (PLZT), $Pb(Mg_3Nb_{2/3})O_3$-$xPbTiO_3$ (PMN-PT) and hafnia ($HfO_2$) exhibit a high dielectric characteristic of a dielectric constant of 100 or higher, as well as piezoelectricity being the electric charge that accumulates in response to tensile or compression by the application of a constant pressure and induces a potential difference between both surfaces, thereby preventing the generation of internal short circuit between both electrodes due to external impact and thus further improving the safety of electrochemical devices. Also, when a mixture of inorganic particles having a high dielectric constant and inorganic particles capable of transporting lithium ions is used, the synergetic effect thereof can be obtained.

In the present disclosure, the inorganic particle capable of transporting lithium ions refers to inorganic particles containing lithium atom which are capable of moving lithium ions without storing the lithium. The inorganic particle capable of transporting lithium ions may transfer and move lithium ions due to a kind of defect existing in the particle structure, so it is possible to improve lithium ion conductivity in the battery and also improve the performance of the battery. Non-limiting examples of the inorganic particles capable of transporting lithium ions include inorganic particles of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), ($LiAlTiP)_xO_y$ type glass ($0<x<4$, $0<y<13$) such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as $LiI$—$Li_2S$—$P_2S_5$, and a mixture thereof.

The inorganic particles are not limited in their size, and may be about 0.01 to about 10 μm, preferably about 0.05 to about 1.0 μm so as to form a coating layer having uniform thickness and suitable porosity. When the size of the inorganic particles satisfies such range, dispersibility is improved to allow easy control of the properties of separators, and the thickness of the coating layer increases to prevent a short circuit that may be generated by deteriorated mechanical property and excessive pore size during battery charge/discharge processes.

In the porous coating layer, the inorganic particles and the binder are present in a ratio of about 50:50 to about 99:1, preferably about 60:40 to about 95:5. The thickness of the porous coating layer consisting of the inorganic particles and the binder is not particularly limited, but may be in the range of about 0.01 to about 20 μm. Also, the pore size and porosity of the porous coating layer are not particularly limited, but the pore size may be in the range of about 0.01 to about 5 μm, and the porosity may be in the range of about 5 to about 75%.

The porous coating layer may further comprise other additives which have been conventionally used in the art, in addition to the above-mentioned the inorganic particles and the binder.

The binder layer is existed in the outermost part of the porous coating layer and comprises a compound of formula (I) and a compound of formula (II). If necessary, a dispersant can be further included. As already described regarding the porous coating layer, the compound of formula (II) is a compound having hexafluoropropylene (HFP) in an amount of 3 wt % or higher as much as the compound of formula (I). In the binder layer, the compound of formula (II) is present in a relatively higher amount than the compound of formula (I). That is, the fraction of the compound of formula (II) in the binder solution is about 50 to about 99%.

In accordance with another aspect of the present disclosure, there is provided an electrochemical device, a cathode, an anode, and the above-mentioned separator being interposed between the cathode and the anode, for example, a lithium secondary battery.

Figure 2:
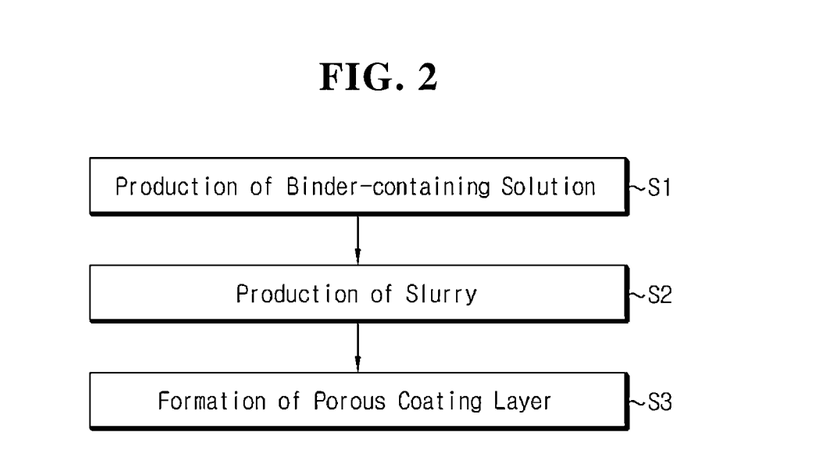
FIG. 2 is a flow chart showing schematically a method of preparing a separator according to one embodiment of the present disclosure.

FIG. 2 is a flow chart showing schematically a method of preparing a separator according to another embodiment of the present disclosure. Referring to FIG. 2, in accordance with another aspect of the present disclosure, there is provided a method of preparing a separator, comprising the steps of producing a binder-containing solution (S1), producing a slurry (S2), and forming a porous coating layer (S3).

In step (S1), a binder is dissolved in a polar solvent to obtain a binder solution, and the binder solution may further comprise a dispersant.

The binder and the dispersant may be used as already described regarding the separator. For example, the binder comprises at least one compound of formula (I) and at least one compound of formula (II) so that a content difference between hexafluoropropylene (HFP) in the compound of formula (I) and that in the compound of formula (II) is 3 wt % or higher.

Also, a fraction of the compound of formula (II) may be greater than 10% and less than 99%, preferably 30 to 90%. At least one compound of formula (I) and at least one compound of formula (II) are used in an amount of about 3 to about 50 parts by weight based on 100 parts by weight of the inorganic particles.

As the binder composing the porous coating layer, besides the above-mentioned binders, an additional binder may be used to strengthen the binding force of the inorganic particles and enhance the durability of the porous coating layer. Such an additional binder may be the same as already described regarding the separator.

The solvent used in the present disclosure is preferable to have a solubility parameter similar to that of the binder, and a low boiling point, so as to achieve uniform mixing and easily remove the solvent used. Especially, it is preferable to use a polar solvent having a boiling point less than 100° C. so as to avoid the deterioration of dispersibility.

Non-limiting examples of the solvent include acetone, tetrahydrofuran, methylene chloride, chloroform, dimethylformamide, N-methyl-2-pyrrolidone (NMP), cyclohexane, water and a mixture thereof.

The solvent is used in an amount of 50 to 90 parts by weight based on 100 parts by weight of the total of solids (i.e., the inorganic particles, the binder and the dispersant) and the solvent (e.g., a polar solvent). If the solvent is used in an amount less than 50 parts by weight based on 100 parts by weight of the total of the solids and the solvent, coating property becomes poor due to viscosity increase, making it difficult to form the binder layer. Thereby, the formation of a thin film becomes difficult. If the solvent is used in an amount higher than 90 parts by weight, it may bring about low productivity and may raise production expense.

In step (S2), inorganic particles are added to the binder solution obtained in step (S1), followed by stirring, to obtain a slurry containing the inorganic particles dispersed therein.

After adding the inorganic particles in the binder solution, a procedure of pulverizing the inorganic particles may be carried out for about 1 to about 20 hours. The pulverized inorganic particles may have a diameter of about 0.01 to about 3 μm. The pulverizing may be carried out by conventional methods, for example a milling method using a ball mill.

The inorganic particles may be the same as already described regarding the separator.

In step (S3), the slurry obtained in step (S2) is coated on at least one surface of a porous substrate, followed by drying, to form a porous coating layer.

The porous substrate may be the same as already described above regarding the separator.

The coating of the slurry having dispersed inorganic particles on the porous substrate may be carried out by conventional methods known in the art, for example, dip coating, die coating, roll coating, comma coating or a combination thereof. Also, the porous coating layer may be optionally formed on one or both surface(s) of the porous substrate.

The coating is preferably carried out at a certain degree of humidity, for example a humidity of about 10% or higher, preferably 15% or higher, more preferably 20% or higher. When the humidity satisfies such range during coating, the slurry may be easily coated, and during the slurry is dried, it is favorable to achieve the distribution variation of the hexafluoropropylene (HFP) component in the coating layer depending on the content of HFP present in a homopolymer of polyvinylidene fluoride and/or a copolymer of polyvinylidene fluoride (PVDF)-co-hexafluoropropylene (HFP).

Specifically, while the slurry is dried after coating, the compound of formula (I) (a first binder) and the compound of formula (II) (a second binder) are subject to a distinctive phase transition by the phenomenon of vapor-induced phase separation. Generally, when phase transition is made by using a non-solvent (e.g., moisture or vapor), as the higher amount of HFP is present, the lower phase transition rate is obtained under the same non-solvent, and the relatively higher amount of the non-solvent is required for the phase transition. For this reason, the first binder having small amounts of HFP is rapidly phase-transited and requires relatively small amounts of a non-solvent, thereby being uniformly distributed throughout the thickness of the porous coating layer finally formed, while the second binder having relatively higher amounts of HFP is slowly phase-transited and requires much more amounts of the non-solvent, thereby being present in an amount more than the first binder on the outermost part of the porous coating layer. According to one embodiment of the present disclosure, a structurally stable porous coating layer is formed and a binder layer is formed thereon to provide good adhesiveness with electrodes according to the above binder phase transition. Also, when a difference of HFP content in the compounds is at least 3 wt % or higher, the desired distribution of the binder can be obtained as already described.

The drying procedure may be carried out by a method known in the art, for example, by a batch or continuous method using an oven or a heating chamber in a temperature range considering the vapor pressure of the used solvent. The drying is to remove almost the solvent remaining in the slurry, and is preferable to be processed as soon as possible, for example, within 1 minute, preferably within 30 seconds.

The separator prepared thus can be used in an electrochemical device. That is, the separator according to one embodiment of the present disclosure can be effectively used as one being interposed between a cathode and an anode.

The electrochemical device may be any device in which electrochemical reactions may occur, and specific examples of the electrochemical devices include all types of primary batteries, secondary batteries, fuel cells, solar cells or capacitors such as a super capacitor device. Particularly, as the secondary batteries, lithium secondary batteries including lithium metal secondary batteries, lithium ion secondary batteries, lithium polymer secondary batteries and lithium ion polymer secondary batteries are preferably used.

The electrochemical device may be manufactured according to conventional methods known in the art. For examples, it may be manufactured by interposing the separator prepared above between a cathode and an anode to obtain an electrode assembly and introducing an electrolytic solution therein.

The electrodes to be used together with the separator of the present disclosure are not particularly limited and may be prepared by binding electrode active materials in a current collector for the electrodes according to conventional methods known in the art. Among the electrode active materials, a cathode active material may be any one which has been conventionally used in electrochemical devices. Non-limiting examples of the cathode active material include lithium manganese oxides, lithium cobalt oxides, lithium nickel oxides, lithium iron oxides, and lithium composite oxides thereof. An anode active material may be any one which has been conventionally used in electrochemical devices. Non-limiting examples of the anode active material include lithium, lithium alloys, and lithium intercalation materials such as carbon, petroleum coke, activated carbon, graphite and other carbonaceous materials. Non-limiting examples of a cathode current collector include aluminum foils, nickel foils and a combination thereof. Non-limiting examples of an anode current collector include copper foils, gold foils, nickel foils, copper alloy foils and a combination thereof.

In one embodiment of the present invention, an electrolyte consisting of a salt and an organic solvent capable of dissolving or dissociating the salt may be used. The salt has a structure represented by $A^+B^-$ wherein $A^+$ is an alkali metal cation such as $Li^+$, $Na^+$, $K^+$ and a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and a combination thereof. Examples of organic solvents suitable for dissolving or dissociating the salt include, but are not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone and a mixture thereof.

The electrolyte may be introduced in any suitable step during the manufacturing of a battery depending on the manufacturing processes and desired physical properties of a final product. Specifically, the electrolyte may be introduced before battery assembly or in the final step of battery assembly.

The separator according to one embodiment of the present invention may be applied in a battery by a conventional winding process, as well as by way of lamination or stacking with an electrode, and folding. Among these, when the separator of the present disclosure is applied by the lamination (stacking) process, the thermal safety of electrochemical devices is substantially improved. This is because batteries manufactured by lamination (stacking) or folding may undergo the severe heat-shrinkage of a separator, as compared with those manufacture by a conventional winding process. Also, when the separator of the present disclosure is applied by the lamination (stacking) process, the electrode can be easily assembled at a higher temperature since a crosslinked binder has good thermal stability and adhesiveness.

Hereinafter, various preferred examples of the present disclosure will be described in detail for better understanding. However, the examples of the present disclosure may be modified in various ways, and they should not be interpreted as limiting the scope of the invention. The examples of the present disclosure are just for better understanding of the invention to persons having ordinary skill in the art.

Preparation of Dispersant

Each component and its content (molar fraction) listed in Table 1 were used to prepare dispersants.

TABLE 1

| Monomer | First Dispersant | Second Dispersant | Third Dispersant |
|---|---|---|---|
| DMAAm | 35 | 30 | 28 |
| DMAEA | — | — | 35 |
| AN | 15 | 15 | 15 |
| EA | 30 | 54 | 30 |
| BA | 10 | — | — |
| IBA | 10 | — | — |
| AA | — | 1 | — |
| HBA | — | — | 2 |

In Table 1, DMAAm represents N,N-dimethylacrylamide; DMAEA, N,N-dimethylaminoethyl acrylate, AN, acrylonitrile; EA, ethyl acrylate; BA, n-butyl acrylate; IBA, isobutyl acrylate; AA, acrylic acid; and HBA, hydroxybutyl acrlate.

Example 1

100 Parts by weight of $Al_2O_3$ (Nippon Light Metal Company Ltd., size distribution d50 0.4 μm) as inorganic particles, 4 parts by weight of polyvinylidene fluoride-co-hexafluoropropylene (Kynar LBG2, containing 5 wt % of HFP) as a compound of formula (I) (hereinafter, referred to as a first binder), 15 parts by weight of polyvinylidene fluoride-co-hexafluoropropylene (Kynar 2500, containing 18 wt % of HFP) as a compound of formula (II) (hereinafter, referred to as a second binder), and 1 part by weight of the third dispersant listed in Table 1 as a dispersant were mixed, and acetone as a solvent was added thereto, to obtain a slurry whose total solids of the first binder, the second binder, the dispersant and the inorganic particles are present in an amount of 20 parts by weight. For sufficient dispersion, the slurry was subject to ball milling for 5 hours.

Figure 3:
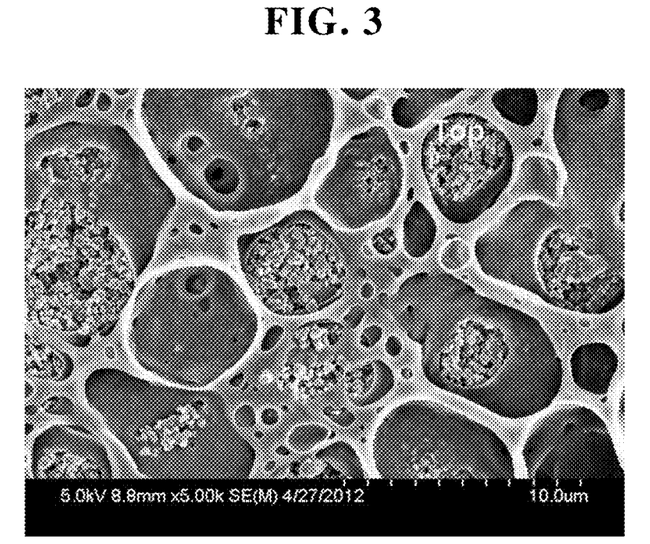
FIG. 3 is an SEM photograph of a surface of the separator prepared in Example 1.
Figure 4:
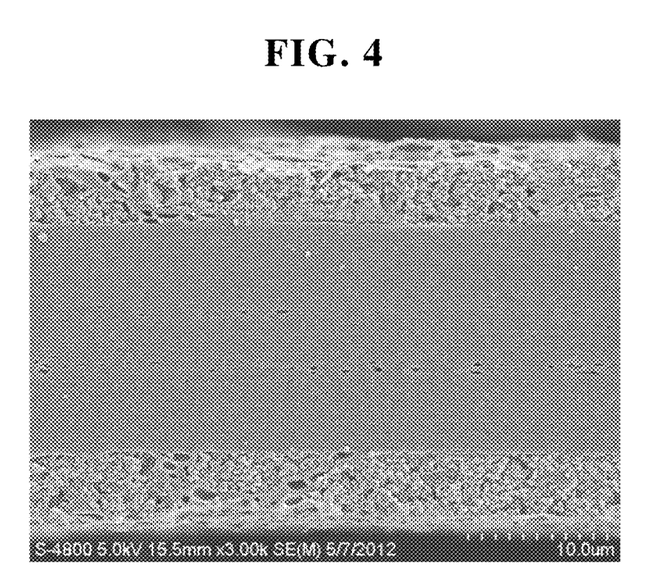
FIG. 4 is an SEM photograph of a cross-section of the separator prepared in Example 1.

The dispersed slurry was coated on both surfaces of a polyolefin membrane (Celgard 2320) at a humidity of 20% or higher by using a dip coater. At this time, the thickness of a coating layer to be formed may be variously controlled in the range of 2 to 10 μm. After coating, drying was carried out so that the solvent in the coating layer can be vaporized within 30 seconds, to finally prepare a separator (see FIGS. 3 and 4).

94 wt % of $LiCoO_2$ as a cathode active material, 3 wt % of carbon black as a conductive material and 3 wt % of PVdF as a binder were added to NMP used as a solvent, to obtain a slurry for a cathode. The slurry was applied on a 20 μm-thick aluminum (Al) film used as a cathode current collector, followed by drying, to prepare a cathode.

96 wt % of carbon powder as an anode active material, 3 wt % of PVdF as a binder and 1 wt % of carbon black as a conductive material were added to NMP used as a solvent, to obtain a slurry for an anode. The slurry was applied on a 10 μm-thick copper (Cu) film used as an anode current collector, followed by drying, to prepare an anode.

The cathode, the anode and the separator thus prepared were assembled by way of stacking, to which a non-aqueous electrolyte solution of 1M $LiPF_6$ dissolved in ethylene carbonate/propylene carbonate/diethyl carbonate (EC/PC/DEC=30:20:50 (wt %)) was introduced, to prepared a lithium secondary battery.

Example 2

The procedures of Example 1 were repeated except that 10 parts by weight of polyvinylidene fluoride-co-hexafluoropropylene (Solef 21510, containing 15 wt % of HFP) was used as the second binder, to prepare a separator and a lithium secondary battery.

Example 3

The procedures of Example 1 were repeated except that polyvinylidene fluoride-co-hexafluoropropylene (Kynar 2850, containing 5 to 7 wt % of HFP) and polyvinylidene fluoride-co-hexafluoropropylene (Solef 11010, containing 10 to 12 wt % of HFP) were used as the first binder and the second binder, respectively, to prepare a separator and a lithium secondary battery.

Example 4

The procedures of Example 1 were repeated except that polyvinylidene fluoride-co-hexafluoropropylene (Kynar 2751, containing 13 wt % of HFP) and polyvinylidene fluoride-co-hexafluoropropylene (Kynar 2500, containing 17 wt % of HFP) were used as the first binder and the second binder, respectively, to prepare a separator and a lithium secondary battery.

Examples 5 and 6

The procedures of Example 1 were repeated except that the first dispersant and the second dispersant listed in Table 1 were used in Examples 5 and 6, respectively, to prepare a separator and a lithium secondary battery.

Comparative Example 1

The procedures of Example 1 were repeated except that 19 parts by weight of polyvinylidene fluoride-co-hexafluoropropylene (Kynar LBG2, containing 5 wt % of HFP) was used alone as a binder, and 1 part by weight of the third dispersant listed in Table 1 was used as a dispersant, to prepare a separator and a lithium secondary battery.

Comparative Example 2

The procedures of Comparative Example 1 were repeated except that the third dispersant listed in Table 1 was not used as a dispersant, to prepare a separator and a lithium secondary battery.

Comparative Example 3

The procedures of Example 1 were repeated except that 19 parts by weight of polyvinylidene fluoride-co-hexafluoropropylene (Kynar, containing 17 wt % of HFP) was used alone as a binder, and 1 part by weight of cyanoethylpulluran was used as a dispersant, to prepare a separator and a lithium secondary battery.

Comparative Example 4

The procedures of Example 1 were repeated except that polyvinylidene fluoride-co-hexafluoropropylene (Solef 11010, containing 10 to 12 wt % of HFP) and polyvinylidene fluoride-co-hexafluoropropylene (Kynar 2850, containing 10 to 12 wt % of HFP) were used as the first binder and the second binder, respectively, to prepare a separator and a lithium secondary battery.

<Properties of Separator and Battery>

Air Permeability of Separator

Each of separators prepared in Examples 1 to 6 and Comparative Examples 1 to 4 was cut into a piece of 50 mm×50 mm. For each sample, the time (seconds) taken for 100 ml of air to pass through each sample was measured, and the results thereof are evaluated as air permeability.

Heat-Shrinkage of Separator

Each of separators prepared in Examples 1 to 6 and Comparative Examples 1 to 4 was left at 150° C. for 1 hour, to measure each heat-shrinkage (%) in the stretching direction.

Adhesiveness Between Porous Coating Layer and Substrate

Each of the separators manufactured in Examples 1 to 6 and Comparative Examples 1 to 4 was fixed on a glass with a double-sided tape, and a tape (a transparent tape, 3M) was firmly adhered to the exposed porous coating layer. After that, the separator was cut into a piece having a width of 15 mm and a length of 100 mm, and force (gf/15 mm) required to release the adhered separator was measured at a rate of 100 mm/min using a tensile strength-measuring instrument.

Adhesiveness Between Layers for Adhesion with Electrodes (Separator-Separator)

Each of the separators manufactured in Examples 1 to 6 and Comparative Examples 1 to 4 was folded into two-folds and laminated at 100° C. and at a rate of 100 mm/min using a laminator. The laminate was cut into a piece having a width of 15 mm and a length of 100 mm, and immobilized on a glass with a double-sided tape. The outside separator was measured for force (gf/25 mm) required to release the laminated separator at a rate of 100 mm/min using a tensile strength-measuring instrument.

Resistance of Separator

Each of the separators manufactured in Examples 1 to 6 and Comparative Examples 1 to 4 was sufficiently wet in an electrolyte solution (ethylene carbonate:ethyl methyl carbonate=1:2 (vol %), 1M $LiPF_6$), and the wet separator was used to prepare a coin-type cell. Each coin-type cell prepared was left at room temperature for 1 day and measured for its resistance by way of an impedance measuring method.

The results of air permeability, heat-shrinkage, adhesiveness and resistance are shown in Table 2.

The invention claimed is:

1. A separator, comprising:
a porous substrate having multiple pores;
a porous coating layer formed on at least one surface of the porous substrate comprising a mixture of inorganic particles and a binder,
the binder comprising at least one compound of formula (I) and at least one compound of formula (II) so that a content difference between hexafluoropropylene (HFP) in the compound of formula (I) and that in the compound of formula (II) is 3 wt % or higher, wherein the binder is present in an amount of 3 to 50 parts by weight based on 100 parts by weight of the inorganic particles;
a binder layer comprising at least one compound of formula (I) and at least one compound of formula (II),
wherein a fraction of the compound of formula (II) in both of the porous coating layer and the binder layer is greater than 10% and less than 99%, the fraction being calculated by dividing the content of the compound of formula (II) with the total content of the compound of formula (I) and the compound of formula (II), and a fraction of the compound of formula (II) in the binder layer is 50% to 99%:

$$-(VDF)_a-(HFP)_b- \qquad (I)$$

$$-(VDF)_c-(HFP)_d- \qquad (II)$$

wherein, VDF represents vinylidene fluoride,
HFP represents hexafluoropropylene, and
each of a, b, c and d represents wt %, provided that a+b=100, c+d=100, b≥0, d>0 and d−b≥3.

2. The separator of claim 1, wherein the fraction of the compound of formula (II) in both of the porous coating layer and the binder layer is 30% to 90%.

3. The separator of claim 1, wherein the porous coating layer further comprises a dispersant.

4. The separator of claim 3, wherein the dispersant is any one selected from acrylic copolymers and a mixture thereof.

5. The separator of claim 3, wherein the dispersant is present in an amount of 0.5 to 5 parts by weight based on 100 parts by weight of the inorganic particles.

6. The separator of claim 4, wherein the acrylic copolymers contain at least one functional group selected from the group consisting of OH, COOH, CN, amine, amide and a combination thereof.

TABLE 2

|  | Ex. 1 | Ex. 2 | Ex. 3 | Ex. 4 | Ex. 5 | Ex. 6 | Com. Ex. 1 | Com. Ex. 2 | Com. Ex. 3 | Com. Ex. 4 |
|---|---|---|---|---|---|---|---|---|---|---|
| Thickness of Separator (μm) | 28 | 28 | 28 | 28 | 28 | 28 | 28 | 28 | 28 | 28 |
| Air Permeability of Separator (sec/100 ml) | 1010 | 910 | 1100 | 1320 | 1210 | 1230 | 930 | 880 | 2030 | 1420 |
| Loading of Coating layer (g/m$^2$) | 18.1 | 17.8 | 17.6 | 17.6 | 17.5 | 17.8 | 16.5 | 15.1 | 18.1 | 15.7 |
| Heat-shrinkage (%) of Separator at 150° C. | 16 | 17 | 18 | 18 | 18 | 16 | 25 | 41 | 18 | 26 |
| Adhesiveness between Porous Coating Layer and Substrate (gf/15 mm) | 210 | 150 | 180 | 220 | 180 | 174 | 88 | 42 | 220 | 170 |
| Adhesiveness between Layers of Adhesion with Electrodes (gf/25 mm) | 120 | 85 | 95 | 105 | 101 | 108 | 45 | 40 | 80 | 58 |
| Resistance of Separator (ohm) | 1.7 | 1.5 | 1.7 | 1.8 | 1.6 | 1.7 | 1.6 | 1.7 | 2.4 | 2.0 |

7. The separator of claim 1, wherein the porous substrate is a polymer membrane or a multiple-membrane thereof, a woven fabric or a non-woven fabric made of a polymer selected from the group consisting of polyethylene, polypropylene, polyethylene terephthalate, polybutylene terephthalate, polyester, polyacetal, polyamide, polycarbonate, polyimide, polyether ether ketone, polyaryl ether ketone, polyetherimide, polyamideimide, polybenzimidazole, polyethersulfone, polyphenyleneoxide, cyclic olefin copolymer, polyphenylenesulfide, polyethylene naphthalate and a mixture thereof.

8. The separator of claim 1, wherein the inorganic particles are selected from the group consisting of inorganic particles having a dielectric constant of 5 or higher, inorganic particles capable of transporting lithium ions, and a mixture thereof.

9. An electrochemical device, a cathode, an anode, and the separator of claim 1 being interposed between the cathode and the anode.

10. The electrochemical device of claim 9, which is a lithium secondary battery.

11. A method of preparing a separator, comprising:
dissolving a binder in a polar solvent to obtain a binder solution, the binder comprising at least one compound of formula (I) and at least one compound of formula (II) so that a content difference between hexafluoropropylene (HFP) in the compound of formula (I) and that in the compound of formula (II) is 3 wt % or higher;
adding inorganic particles to the binder solution, followed by stirring, to obtain a slurry containing the inorganic particles dispersed therein, wherein the binder is used in an amount of 3 to 50 parts by weight based on 100 parts by weight of the inorganic particles; and
coating the slurry on at least one surface of a porous substrate, followed by drying, to form a porous coating layer on at least one surface of the porous substrate or on at least one pore-bearing area in the porous substrate, the porous coating layer comprising a binder layer in the outermost part thereof in the thickness direction of the porous substrate, the binder layer having the compound of formula (II) in a fraction of 50% to 99%, the fraction being calculated by dividing the content of the compound of formula (II) with the total content of the compound of formula (I) and the compound of formula (II),
wherein a fraction of the compound of formula (II) in the binder solution is greater than 10% and less than 99%:

(I)

(II)

wherein, VDF represents vinylidene fluoride,
HFP represents hexafluoropropylene, and
each of a, b, c and d represents wt %, provided that a+b=100, c+d=100, b≥0, d>0 and d−b≥3.

12. The method of claim 11, wherein the fraction of the compound of formula (II) in the binder solution is 30% to 90%.

13. The method of claim 11, wherein the binder solution further comprises a dispersant.

14. The method of claim 13, wherein the dispersant is any one selected from acrylic copolymers and a mixture thereof.

15. The method of claim 13, wherein the dispersant is used in an amount of 0.5 to 5 parts by weight based on 100 parts by weight of the inorganic particles.

16. The method of claim 14, wherein the acrylic copolymers contain at least one functional group selected from the group consisting of OH, COOH, CN, amine, amide and a combination thereof.

17. The method of claim 11, wherein the porous substrate is a polymer membrane or a multiple-membrane thereof, a woven fabric or a non-woven fabric made of a polymer selected from the group consisting of polyethylene, polypropylene, polyethylene terephthalate, polybutylene terephthalate, polyester, polyacetal, polyamide, polycarbonate, polyimide, polyether ether ketone, polyaryl ether ketone, polyetherimide, polyamideimide, polybenzimidazole, polyethersulfone, polyphenyleneoxide, cyclic olefin copolymer, polyphenylenesulfide, polyethylene naphthalate and a mixture thereof.

18. The method of claim 11, wherein the inorganic particles are selected from the group consisting of inorganic particles having a dielectric constant of 5 or higher, inorganic particles capable of transporting lithium ions, and a mixture thereof.

19. The method of claim 11, wherein the polar solvent has a boiling point less than 100° C.

20. The method of claim 11, wherein the polar solvent is selected from the group consisting of acetone, tetrahydrofuran, methylene chloride, chloroform, dimethylformamide, N-methyl-2-pyrrolidone (NMP), cyclohexane, water and a mixture thereof.

21. The method of claim 11, wherein the polar solvent is used in an amount of 50 to 90 parts by weight based on 100 parts by weight of the total of the inorganic particles, the binder, the dispersant and the polar solvent.

22. The method of claim 11, wherein the slurry is applied at a humidity of 10% or higher.

23. A separator prepared by the method of claim 11.

* * * * *